(12) United States Patent (10) Patent No.: US 8,923,371 B2
Sindalovsky et al. (45) Date of Patent: Dec. 30, 2014

(54) SERDES DATA SAMPLING GEAR SHIFTER

(71) Applicant: LSI Corporation, Milpitas, CA (US)

(72) Inventors: Vladimir Sindalovsky, Allentown, PA (US); Lane A. Smith, Allentown, PA (US); Mohammad S. Mobin, Allentown, PA (US)

(73) Assignee: LSI Corporation, San Jose, CA (US)

( * ) Notice: Subject to any disclaimer, the term of this patent is extended or adjusted under 35 U.S.C. 154(b) by 46 days.

(21) Appl. No.: 13/729,405

(22) Filed: Dec. 28, 2012

(65) Prior Publication Data

US 2014/0185658 A1 Jul. 3, 2014

(51) Int. Cl.
*H04B 1/38* (2006.01)
*H04B 1/40* (2006.01)

(52) U.S. Cl.
CPC .................................... *H04B 1/40* (2013.01)
USPC ........... 375/222; 375/219; 375/226; 375/227; 375/229; 375/232

(58) Field of Classification Search
CPC . H04L 25/03885; H04L 7/0331; H04L 27/01; H04L 25/03006; H04B 1/0475
USPC ......... 375/222, 219, 226, 227, 229, 232, 346, 375/348, 350
See application file for complete search history.

(56) References Cited

U.S. PATENT DOCUMENTS 7,616,686 B2 * 11/2009 Aziz et al. ..................... 375/233
8,090,011 B2 1/2012 Asami
8,107,522 B2 * 1/2012 Aziz et al. ..................... 375/233
8,315,300 B2 * 11/2012 Pozzoni ........................ 375/233
8,619,848 B2 * 12/2013 Jiang ............................ 375/233
2004/0234014 A1 * 11/2004 Chen ............................ 375/350
2006/0034394 A1 * 2/2006 Popescu et al. ............... 375/326
2006/0109940 A1 * 5/2006 Beukema et al. ............ 375/350
2010/0046683 A1 * 2/2010 Beukema et al. ............ 375/355
2010/0103999 A1 * 4/2010 Leibowitz et al. ........... 375/233
2010/0135378 A1 * 6/2010 Lin et al. ...................... 375/233
2010/0289544 A1 * 11/2010 Lee et al. ..................... 327/159
2011/0188566 A1 * 8/2011 Beukema et al. ............ 375/233
2012/0114023 A1 * 5/2012 Mobin et al. ................. 375/219
2012/0257652 A1 10/2012 Malipatil et al.

FOREIGN PATENT DOCUMENTS

EP 1 023 793 B1 3/2012

* cited by examiner

*Primary Examiner* — Kenneth Lam
(74) *Attorney, Agent, or Firm* — Suiter Swantz pc llo

(57) ABSTRACT

A SerDes data sampling controller that includes a gear shifting data sampling clock that zeroes the data sampling skew at the center of the unit interval during the CDR phase lock stage, and then skews the data sample timing away from the center of the unit interval as the DFE coefficients adapt during the data transfer stage. This allows the controller to implement the best (unskewed) data sample timing during the CDR phase locking stage, and then skew the data sample timing after the DFE coefficients have adapted to provide the best (skewed) data sample timing for data bit sampling during the data transfer stage. The data sampling gear shifter may apply a variable skew value to the transition sampling or quadrature (Q) data sampling clock differentially varying the quadrature (Q) transition sampling clock from the inphase (I) data sampling clock.

9 Claims, 4 Drawing Sheets

SERDES DATA SAMPLING GEAR SHIFTER

TECHNICAL FIELD

The present invention relates to serializer-deserializer (SerDes) data bus interfaces, such as universal serial bus (USB) interfaces, for computer systems and, more particularly, to a data sampling gear shifter that improves clock and data recovery (CDR) phase locking and adaptive decision feedback equalization (DFE) in high speed SerDes data interfaces.

BACKGROUND

High speed serial bus interfaces, such as universal serial bus (USB) interfaces, have become increasingly important as data hungry peripheral devices have proliferated. The serializer-deserializer (SerDes) at the heart of a serial bus interface transfers data between a serial data channel and a parallel data bus, such as the internal system bus serving a CPU motherboard. For a typical serial port connected to a computer, the SerDes (serializer direction) takes data from the computer's parallel system bus and puts the data onto the serial communication channel (i.e., serializes the data). Similarly, for input data, the SerDes (deserializer direction) takes the data off the serial channel and puts the data onto the computer's parallel system bus (i.e., deserializes the data). Computer engineers are continually striving to increase SerDes data transfer rates, improve reliability, and decrease costs.

A high speed SerDes interface implements a clock and data recovery (CDR) phase locking stage to synchronize the interface to the serial data rate. During the CDR phase locking stage, the SerDes data sampling controller detects and locks onto the source data rate and phase timing, which is typically set by the clock rate of the host computer that created the data stream. Once phase locking stage has been achieved, high speed data transfer (deserialization) proceeds during the data transfer stage. The time period during which the error free data bits can be reliably detected (referred to as the serial eye) shrinks as the data transfer rate approaches the physical limits of the underlying data channel. It therefore becomes increasingly difficult, in general, to lock onto the serial data stream as the data transfer rates increase.

During the data transfer stage, adaptive decision feedback equalization (DFE) facilitates data bit detection by compensating for inter-symbol interference (ISI) incurred in the serial data channel. [Transition and data sampling time skew is mostly used to compensate for data eye distortion after DFE adaptation]. SerDes phase locking problems can be exacerbated by the DFE adaptation functionality, which tends to skew (phase shift) the timing of the transition sampling phase away from the time-based center of the unit interval in order to achieve the best vertical eye opening at the data sampling point. At high data transfer rates, the data eye can become substantially shifted as a result of DFE induced phase sample skew moving the transition sample phase toward the periphery of the serial data eye. In this situation, DFE adaption can significantly degrade the ability of the CDR to achieve a low error rate in the recovered serial data stream.

There is, therefore, a continuing need for improved techniques for SerDes phase locking and, more particularly, a need to mitigate the adverse effects that DFE adaption can have on CDR phase locking in SerDes interfaces.

SUMMARY

The needs described above are met in a SerDes data sampling controller that includes a gear shifter that applies a variable skew value to differentially vary the transition (Q) sampling clock from the inphase (I) data sampling clock. More specifically, an illustrative gear shifter may initially apply an unskewed transition sampling clock (i.e., data sampling at the center of the unit interval between transition sampling points) during the CDR phase lock stage to cause a quadrature relation between the inphase data samples and the transition samples while the data sampling controller synchronizes (phase locks) to the serial data stream. The gear shifter then skews the transition sampling clock (i.e., shifts the phase of the transition sampling clock away from data sampling clock) as the feedback control parameters adapt during the data transfer stage to track asymmetry in the serial data eye, which is typically caused by adaption of the feedback control coefficients to compensate for inter-symbol interference in the serial data stream. As a result, the improved SerDes interface implements the best (unskewed at the center of the unit interval) data sample timing during the CDR phase locking stage when synchronizing to the serial data stream, and then skews the data sample timing (phase shifts away from the center of the unit interval) after the feedback control parameters have adapted to track asymmetry in the serial data eye to provide the best transition sample timing during the data transfer stage.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE FIGURES

The numerous advantages of the invention may be better understood with reference to the accompanying figures in which.

DETAILED DESCRIPTION OF ILLUSTRATIVE EMBODIMENTS

The invention may be embodied in a SerDes data sampling controller that transfers data bits from a serial data stream to a parallel data stream. The controller includes an inphase data sampler configured to time the inphase data samples of the serial data stream at data time intervals separated by unit interval duration. The controller also includes a transition data sampler configured to time the transition samples of the serial data stream at transition time intervals nominally separated from the inphase data samples by one-half of the unit interval (i.e., the data samples are nominally set at the at the center of the unit interval). A decision feedback equalizer applies feedback control parameters to adaptively adjust the serial data stream causing asymmetry of a serial data eye defined by the serial data stream. A gear shifter applies a variable skew value causing a differential timing between the inphase data samples and the transition samples and varies the skew value to cause the transition samples to track the asymmetry of the data eye.

When CDR locks to incoming serial data, differential feedback equalization is typically at zero influence, and hence does not skew data eye. All enhancements to the eye at this point are due to the variable gain amplifier and the linear equalizer. Before DFE adapts (i.e., when the DFE coefficients are initially set to zero), CDR has the best opportunity to lock to the serial data stream even if the recovered data error rate is relatively high. After phase lock to the serial data stream has been achieved, DFE adaptation is allowed to begin. Although other data sampling objectives may be considered, the goal of DFE adaptation typically includes compensation for inter-symbol interference (ISI) incurred in the serial connection media.

Figure 2:
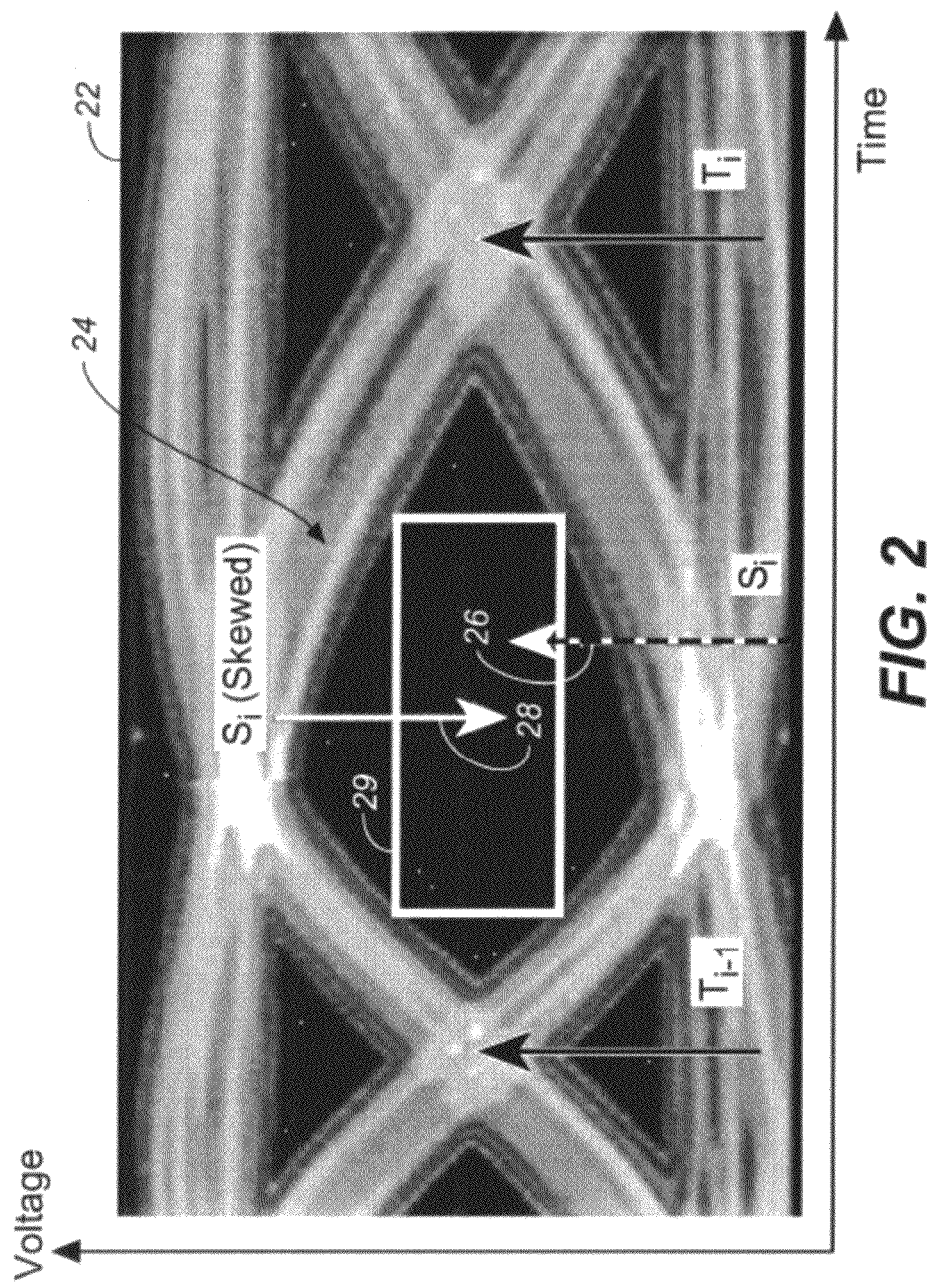
FIG. 2 is a graph of data traffic in the SerDes controller after feedback control adaption showing an asymmetric serial eye.

DFE attempts to open the data eye at the data sampling point thus increasing vertical margin and making recovered data error rate reduced. The byproduct of adapted DFE functionality is asymmetry introduced to the data eye. In particular, the data eye is typically shifted left and lopsided (as shown in FIG. 2). After DFE adaptation settles, the best vertical and horizontal margins can therefore be achieved by shifting the data sampling point to the left (earlier in time) away from the center of the unit interval.

If sampling point were to be shifted left before DFE adaptation starts and prior to achieving phase lock, however, this would impair CDR ability to lock to the serial data stream. The gear shifter of the present invention overcomes this problem by phase shifting (skewing) the data sampling point making this skew zero (i.e., data sampling at the center of the unit interval) for the initial lock to data, and then gear shifting it to the final skewed sampling time (i.e., phase shifted away from the center of the unit interval) to track the asymmetry introduced into the serial data eye by DFE adaption.

In one example embodiment, the gear shifter may apply a first skew value during the phase locking stage when synchronizing the data sampling controller to the serial data stream, which causes a substantially quadrature relation (zero data sampling skew resulting in data sampling at the center of the unit interval) between the quadrature transition samples when synchronizing to the serial data stream. Once phase lock has been achieved, the gear shifter applies a second skew value (non-zero data sampling skew resulting in data sampling away from the center of the unit interval) during the data transfer stage to cause the data samples to track asymmetry of the data eye caused by adaption of the feedback parameters.

In particular, the feedback control parameters may be initialized to zero and the first skew value may be initially set to zero during the phase locking stage causing the data samples to be taken at the nominal position at the center of the unit interval. Once phase lock has been achieved, the feedback control parameters adapt to non-zero values and the second skew value is set to a non-zero value shifting the data samples away from the center of the unit interval to track the asymmetry of the data eye caused by as adaption of the feedback parameters. The feedback control parameters typically include decision feedback equalization (DFE) parameters selected to compensate for inter-symbol interference in the serial data stream. Additional feedback control parameters may include a variable gain parameter and a linear equalizer parameter. Typically, the DFE feedback control parameters are set to the zero during the phase lock stage, while the variable gain and linear equalizer feedback control parameters are not typically zeroed for phase lock.

Figure 1:
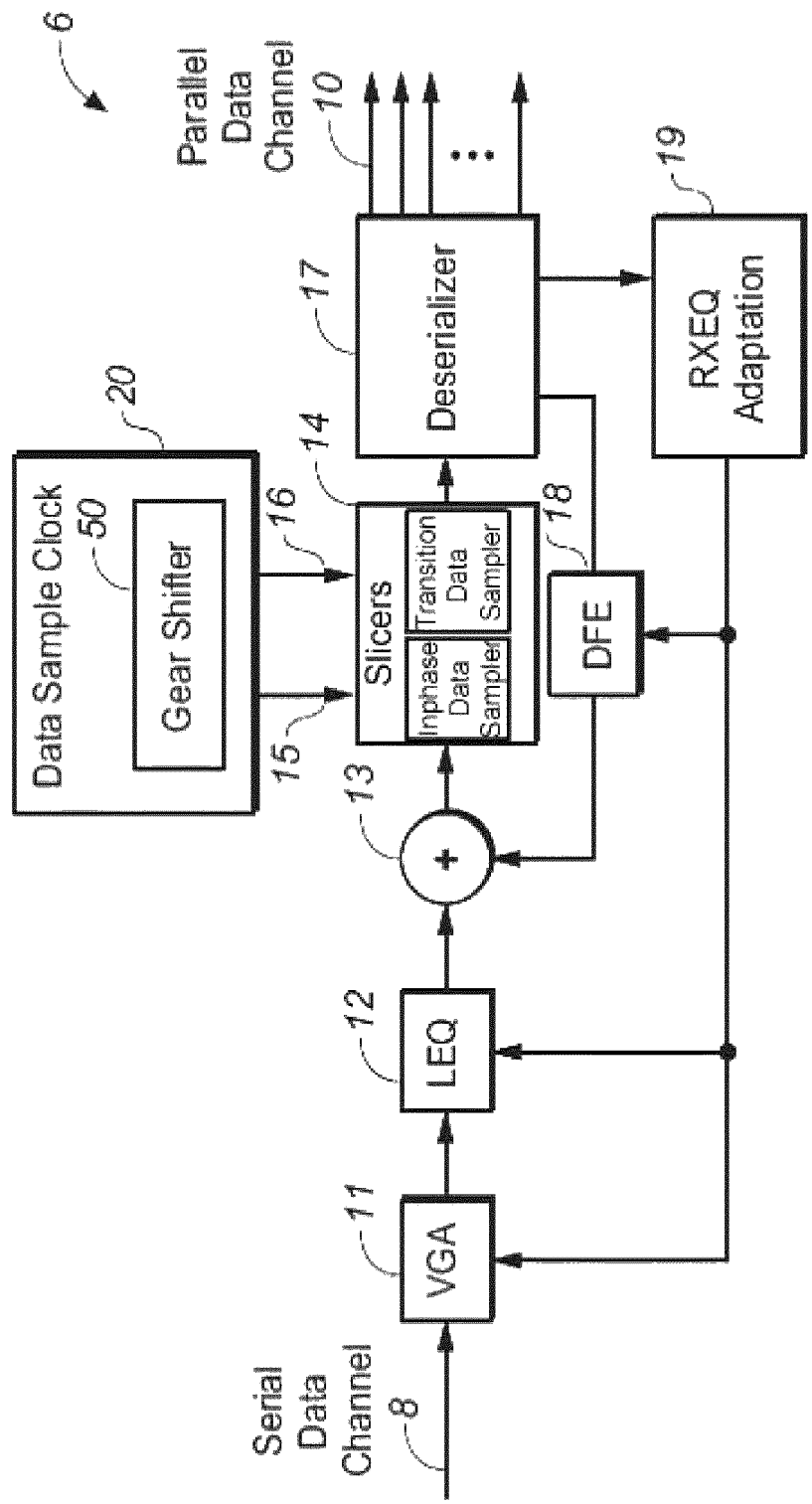
FIG. 1 is a block diagram of a SerDes data sampling controller with a transition sampling gear shifter.

Referring to the figures which illustrate one particular embodiment of the invention, FIG. 1 is a block diagram of a SerDes data sampling controller 6 that receives data from a serial data channel 8, deserializes the data, and feeds the deserialized data onto a parallel data channel 10. A similar SerDes interface operates to receive data from the parallel data channel 10, serialize the data, and feed the serialized data onto the serial data channel 8. The present invention is operative in the deserializer direction to facilitate locking onto an incoming data stream on the serial data channel 8 during the CDR phase locking stage to synchronize the data sampling controller to the serial data stream. Once phase lock has been achieved, during the data transfer stage, the gear shifter adaptively adjusts the transition sampling phase to track skew introduced into the data eye by DFE adaption to achieve certain data sampling objectives, such as compensation for inter-symbol interference in the serial data stream, through use of the gear shifter 50 of the data sampling clock 20.

More specifically, the SerDes data sampling controller 6 includes a variable gain amplifier (VGA) 11 that feeds a linear equalizer (LEQ) 12, which feeds a feedback summer 13. The feedback controlled signal produced by the summer 13 is data sampled by slicers 14, which include an inphase (I) data sampler and a transition or quadrature (Q) data sampler. The slicers 14 operate pursuant to an inphase (I) data sample clock signal 15 and a quadrature (Q) transition sample clock signal 16 provided by the data sampling clock 20. The gear shifter 50 is operable to adjust the skew (relative timing or phase shift) between the inphase (I) data sample clock signal 15 and the quadrature (Q) transition sample clock signal 16. The data and transition samples produced by the slicers 14 are provided to a deserializer 17, which routes the detected data bits onto the parallel data bus 10.

A Decision Feedback Equalizer (DFE) 18 adaptively adjust the feedback signal of the summer 13 to enhance the quality of signal provided to slicers 14, such as compensation for inter-symbol interference in the serial data stream. A receiver equalization (RXEQ) adaption block 19 adaptively adjusts the feedback parameters applied by the DFE 18 feedback control loop. The (RXEQ) adaption block 19 may also adjust the gain applied by the VGA 11 and the equalization parameters applied by the LEQ 12.

The serial data, which is usually degraded after transmission through the serial data channel 8, typically goes through amplification in the VGA 11 and may be further enhanced in the LEQ 12 to compensate for potential low pass filtering characteristics of the serial data channel 8. The data signal is then sent to the summing node 13 for additional enhancement using the DFE 18 feedback control loop. The RXEQ 19 adapts the feedback control parameters applied by the DFE 18 feedback control loop to adjust for particular channel characteristics, for example to compensate for inter-symbol interference in the serial data channel 8. Finally, the enhanced serial signal is sampled by the slicers 14 and put onto the parallel data bus 10 by the deserializer 17.

The data signal from the deserializer 17 is also fed into the RXEQ adaptation block 19 for adaptive feedback control of the DFE coefficients applied by the DFE block 18, which typically causes asymmetry in the serial data eye as shown in FIG. 2. The RXEQ adaptation block 19 may also apply adaptive feedback control to the VGA gain and the LEQ equalization parameters. Feedback parameter adaptation typically requires several samples taken for each serial data symbol, which includes several data (inphase) samples and transition (quadrature) sample used for clock data recovery (CDR). The initial data samples are also used to compute the error samples used in least means squared (LMS) algorithms applied by the RXEQ adaptation block 19 to adaptively adjust the coefficients of the DFE 18 control block. The RXEQ adaptation block 19 may also adaptively adjust feedback control parameters for the VGA 11, the LEQ 12, and any other desired feedback control parameters.

Enhancement of the serial data using the DFE 18 block typically results in the data eye being asymmetric ("lopsided") after the DFE coefficients have adapted to non-zero values. FIG. 2 is a graph 22 of data traffic in the SerDes data sampling controller 6 after DFE adaption showing asymmetry of the serial eye 24. The horizontal size (duration) of the serial eye 24, also called unit interval (UI), is the span between the two quadrature (Q) time points $T_i$ and $T_{i-1}$. The nominal data (I) sampling phase $S_i$ 26 is located at the time-based or geometrical center (quadrature position) between the quadrature time points $T_i$ and $T_{i-1}$. As can be seen in FIG. 2, the data sampling phase $S_i$ 26 located at the time-based center of the serial eye 24 in the presence of adapted DFE is not the optimal data sampling point because it does not provide for the best horizontal and vertical margins. The receiver RX horizontal data sampling margins can therefore be improved by shifting the data sampling phase to the left (or transition sampling phase to the right), as represented by the skewed data sampling phase $S_i$ (skewed) 28 to produce the improved data sampling margins 29 represented by the rectangle in FIG. 2.

Conventional CDR phase locking techniques use the skewed transition sampling timing $S_i$ (skewed) 28 during the CDR phase lock stage, assuming that the skew won't prevent CDR from locking. However, the DFE coefficients are typically set to zero at the CDR phase lock stage, which does not introduce the asymmetry of the data eye 24 shown in FIG. 2. Since the actual data eye is symmetrical during the phase lock stage, the DFE induced skew reflected in the data sampling phase $S_i$ (skewed) 28 moves the data sampling phase away from the center of the data eye during the phase locking stage. As a result, these conventional SerDes approaches may require multiple attempts or prolonged times for the CDR to lock to the incoming serial data and the CDR may experience high error rates or even fail to lock entirely at high data rates when the serial data eye is considerably closed.

Figure 3:
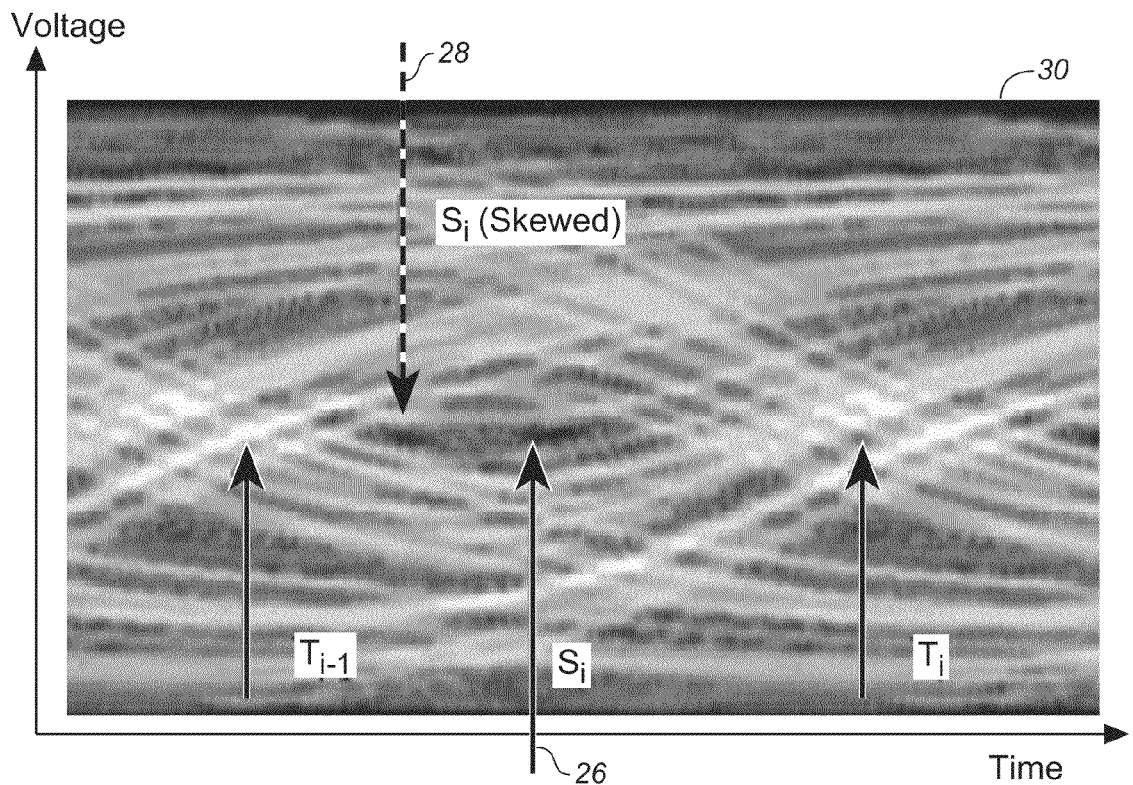
FIG. 3 is a graph of data traffic in the SerDes controller prior to feedback control adaptation.

In other words, using a skewed transition and data sampling phase during the phase locking stage can prevent the CDR from achieving a phase lock. This is shown in FIG. 3, which is a graph 32 of data traffic in the SerDes controller 6 prior to adapted non zero DFE coefficients. Sampling the data at the data sampling phase $S_i$ (skewed) 28 set for DFE adaption rather than the time-centered $S_i$ 26 during the phase locking stage can prolong or prevent CDR from achieving phase lock. To facilitate CDR phase lock, the data sampling phase is set at the time-based center phase $S_i$ 26 during the phase lock stage, and then after the CDR has locked onto the correct data clock, the data sampling phase is gradually shifted to the skewed position $S_i$ (skewed) 28 as the DFE coefficients adapt to compensate for inter-symbol interference in the serial data stream based on the actual physical characteristics of the serial data channel 8 (it is equivalent to shift transition sampling phase instead of shifting data sampling phase).

Figure 4:
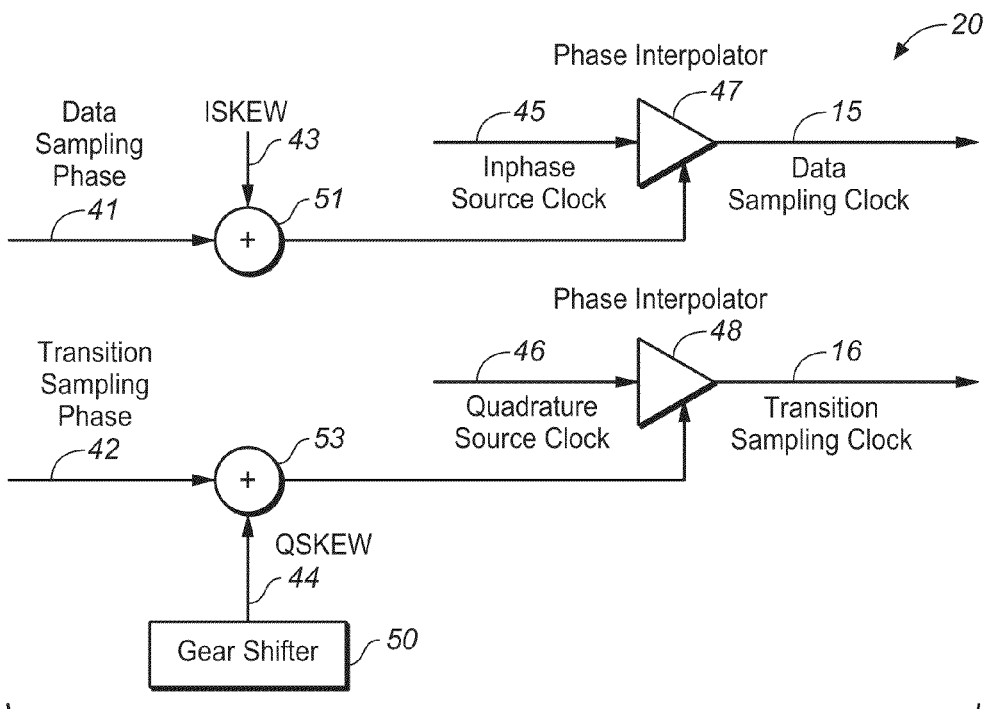
FIG. 4 is a block diagram of the SerDes data sampling controller with an example transition sampling gear shifter.

FIG. 4 is a block diagram of an illustrative data sample clock 20 with a data sampling gear shifter 50 to provide this functionality. A nominal inphase (I) data sampling phase clock signal 41 is time shifted by an ISKEW value 43 phase adjustment parameter applied by a summer 51. The inphase (I) data sampling phase clock signal 41 as finely adjusted by the ISKEW value 43 sets the data point $S_i$ in respect to transition sampling points $T_i$ and $T_{i-1}$ shown in FIG. 3. Similarly, a nominal transition or quadrature (Q) transition sampling phase clock signal 42 is phase adjusted by a QSKEW value 44 phase adjustment parameter applied by a summer 53. The recovered data sampling phase 41 for data (and also error) and the recovered transition sampling phase 42 determined during the clock data recovery (CDR) stage, before I-Q skews are applied, have a nominal quadrature offset (i.e., UI/2 separated, or 90 degrees out of phase).

The arithmetic adder 51 may fine tune the data and transition sampling points within the unit interval by adding an ISKEW value 43 to the data (and error) sampling phase 41, and the arithmetic adder 53 may fine tune the timing of the transition samples by adding a QSKEW value 44 to the transition sampling phase 42. The outputs of the two adders 43, 53 are used as controls for two interpolators 47, 48, respectively, creating the corresponding data and transition phase sampling clock signals 15, 16.

When the two skew values 43, 44 are equal then the data and transition phases clocks 15, 16 will remain in their nominal quadrature relation (zero data sampling skew). When the two skew values 43, 44 are not equal, however, a constant phase offset is introduced between the nominal quadrature relation of the data and transition clocks 15, 16 (non-zero data sampling skew). As the QSKEW value 44 is used to fine tune the timing (phase) of the transition sampling phase (i.e., $T_i$ and $T_{i-1}$ shown in FIGS. 2 and 3) to synchronize the data sampling clock to the serial data rate determined during the CDR phase lock stage, the data sample nominally occurs at the center of the unit interval (i.e., the quadrature position 90 degrees out of phase with respect to initiation of the transition sampling phase at $T_i$) represented by the time-centered data sample phase $S_i$ 26 shown in FIG. 2. Varying the QSKEW value 44 from the ISKEW value 43 therefore has the effect of moving the data sample phase away from the center position $S_i$ 26 representing the nominal data phase toward the skewed transition sample phase $S_i$ (skewed) 28, as shown in FIG. 2. In this example, the data sampling controller applies the nominal data phase $S_i$ 26 by setting QSKEW 44 equal to ISKEW 43 during the phase locking phase prior to adaption of the DFE feedback control parameters. Once phase lock has been achieved, the data sampling controller applies the skewed phase $S_i$ 28, typically by gradually imposing a differential between QSKEW 44 and ISKEW 43, during the data transfer stage to cause the data sampling phase to track the asymmetry of the data eye 24 caused by adaption of the DFE feedback control parameters.

As illustrated by the graph 30 shown in FIG. 3, having a skewed data sampling phases 28 during the phase locking stage can significantly degrade the ability of the CDR to lock to the source data. This is because the serial data eye at the slicers 14 may be skewed substantially away from the data sampling point when sampling at the skewed position $S_i$ (skewed) 28 instead of the nominal transition position $S_i$ 26 as illustrated by FIG. 3. CDR phase locking typically requires a limited (usually better than $10^{-3}$) error rate in order to lock to serial data, and RX adaptation cannot proceed correctly until CDR is locked. Skewed data sampling phase at the phase lock stage can therefore interfere with the CDR ability to lock to the serial data clock by moving the data sampling point toward the periphery of the serial eye. In addition, since DFE coefficients usually start adaptation from zero seeds, there is no DFE related distortion to the symmetry of the eye at the phase lock stage. As a result, data sampling phase skew is not needed until after phase lock has been achieved and DFE coefficients adapted to nonzero values. The gear shifter 50 therefore facilitates phase lock by locating the transition sampling phase into the nominal quadrature relation to inphase data points (i.e., the nominal data sampling phase $S_i$ 26 shown in FIG. 3) in order for CDR to have the best conditions for achieving phase locking to the serial data clock. After phase lock has been achieved, the VGA, LEQ, and DFE feedback control parameters are allowed to adapt and the transition sampling phase is shifted to provide for the skewed position $S_i$ (skewed) 28 shown in FIG. 3.

Figure 5:
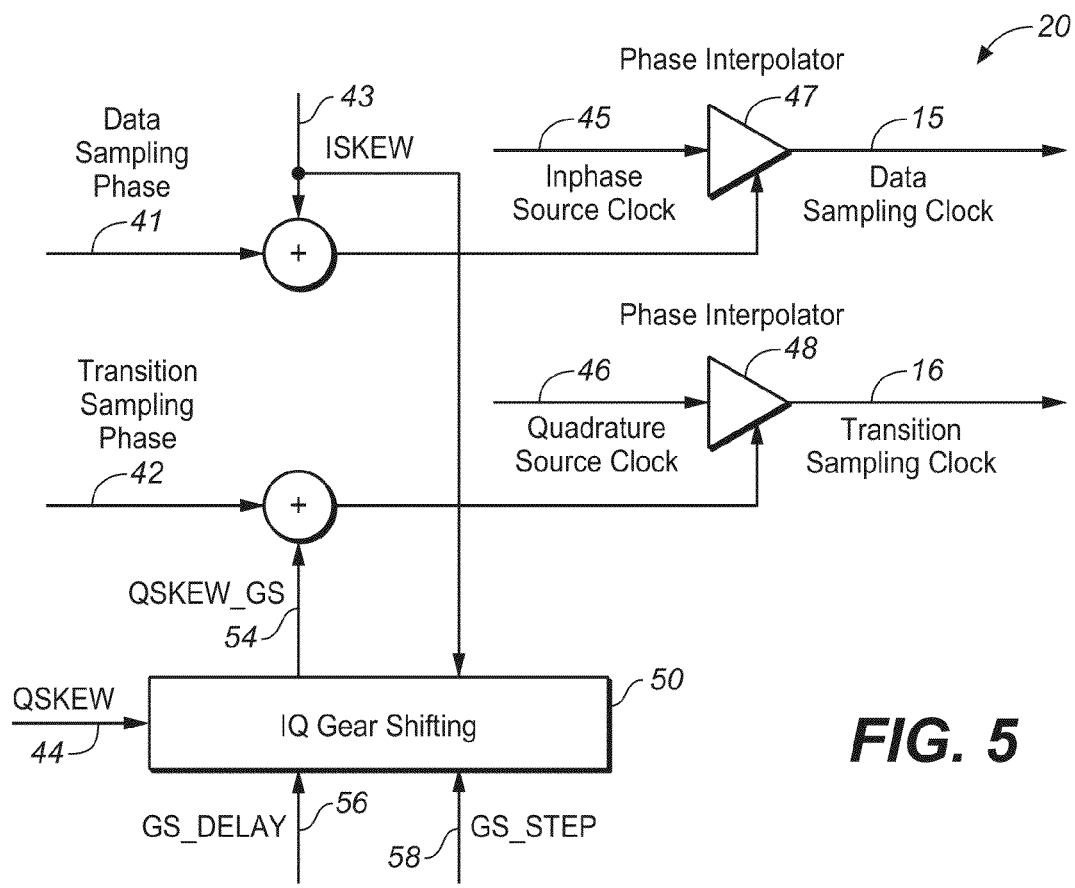
FIG. 5 is a block diagram showing additional details of the transition sampling gear shifter.

FIG. 5 is a block diagram of a data sample clock 20 with a data sampling gear shifter 50 utilizing quadrature skewing. According to FIG. 5, ISKEW value 43 is set to finely tune the timing of the unit interval without phase shifting, while the QSKEW value 44 is applied to the gear shifting block 50, which produces a gear shifted value of QSKEW-QSKEW_GS 54. The gear shifted value QSKEW_GS 54 is initially assigned the same value as ISKEW 43 to produce the nominal quadrature phase offset between data and transition sampling (i.e., data sampling at the time-based center phase $S_i$ 26 of the unit interval shown in FIG. 3). After a delay programmed through the GS_DELAY input 56 sufficient to allow phase lock to be achieved, which may come from a control register, gear shifting begins to be applied to impose skew into QSKEW_GS 54. This delay gives the CDR an opportunity to achieve phase lock to the serial data stream before skew is applied to vary the data sample phase from the center of the unit interval to track asymmetry of the serial data eye caused by adaption of the DFE feedback control parameters.

Gear shifting of the transition sample phase through QSKEW_GS 54 may proceed at programmable timing intervals GS_STEP 58 incrementing or decrementing QSKEW_GS towards the final value of QSKEW. The final value may be preset, programmable, or determined through feedback control. Gear shifting ends when QSKEW_GS 54 becomes equal to a desired QSKEW value. Application of the skew is preferably controlled to closely follow the distortion of the serial data eye caused by DFE adaption, which is used to compensate for inter-symbol interference in the serial data stream. The QSKEW_GS value is therefore selected to maintain the largest data sampling margins by keeping the data sampling phase in the region with the biggest vertical and horizontal opening of the serial data eye.

Figure 6:
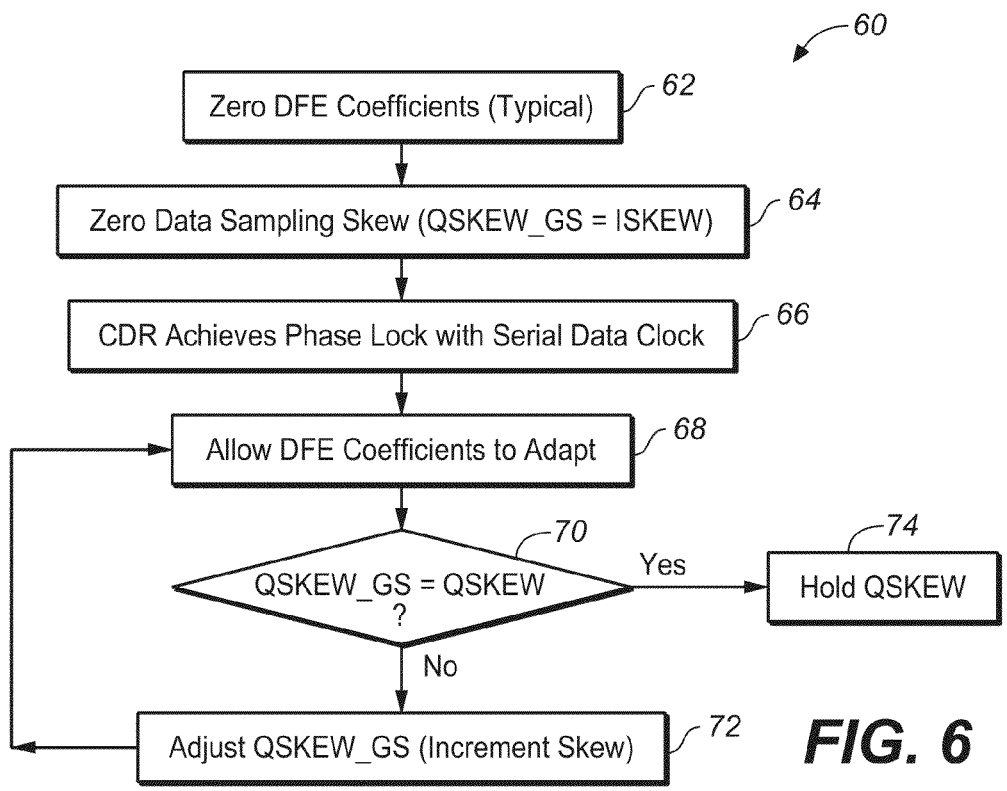
FIG. 6 is a logic flow diagram illustrating operation of the SerDes data sampling controller.

FIG. 6 is a logic flow diagram 60 illustrating operation of the data sampling gear shifter 50 in the SerDes data sampling controller 6. The procedure begins prior to phase lock, which is the situation illustrated by the graph 30 shown in FIG. 3. In step 62, the DFE coefficients are typically set to zero which removes the asymmetry of the serial data eye 24 shown in FIG. 2. Additional feedback control parameters, such as VGA gain and LEQ equalization parameters may also be zeroed out or set to the best expected values prior to phase lock. Step 62 is followed by step 64, in which the transition data sampling skew (QSKEW-GS) is set to ISKEW. This sets the transition sampling skew (QSKEW-GS) to be the same as the inphase data sampling skew (ISKEW) to place the data sampling phase in the nominal time-based center position of the unit interval for the CDR phase lock phase. The nominal data sample phase timing is illustrated by the time-centered data sampling phase $S_i$ 26 shown in FIG. 3. Step 64 is followed by step 66, in which CDR achieves phase lock with the serial data clock. Step 66 is followed by step 68, in which the DFE coefficients are allowed to adapt, typically to compensate for inter-symbol interference in the serial data stream. Additional feedback control parameters may also be allowed to adapt, such as the VGA gain and the LEQ equalization parameters, as provided by the feedback control circuitry shown schematically in FIG. 1.

Feedback control adaption, particularly of the DFE coefficients, results in asymmetry of the serial eye 24 as shown in FIG. 2. The transition sampling phase is therefore adjusted accordingly to achieve operational objectives, such as compensation for asymmetric eye as illustrated by FIG. 2. Step 68 is therefore followed by step 70, in which it is determined whether the transition skew (QSKEW_GS) has been set to its desired value after adaption of the DFE coefficients and any other adaptively adjusted feedback control parameters. The desired transition skew in this example is represented by $S_i$ (skewed) 28 shown in FIG. 2. If the transition data sampling skew QSKEW_GS has not reached the desired value, the "No" branch is followed to step 72, in which the skew is adjusted (increment QSKEW_GS). Step 72 then loops back to step 68 for another iteration. Once the transition data sampling skew QSKEW_GS has reached the desired value, the "Yes" branch is followed to step 77, in which the skew is held at the desired value, which is represented by $S_i$ (skewed) 28 shown in FIG. 2. It should be appreciated that the final value of QSKEW_GS may be set to a predetermined or user defined value, determined programmatically, or it may be configured to follow the DFE parameters as they adjust through ongoing adaption in the feedback control process.

The present invention may consist (but not required to consist) of adapting or reconfiguring presently existing systems. Alternatively, original equipment may be provided embodying the invention.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

It is further contemplated that each of the embodiments of the method described above may include any other step(s) of any other method(s) described herein. In addition, each of the embodiments of the method described above may be performed by any of the systems described herein.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The invention claimed is:

1. A data sampling controller for a deserializer operative for transferring from a serial data stream into a parallel data stream, comprising:
   an inphase data sampler configured to time inphase data samples of the serial data stream at data time intervals separated by a unit interval duration;
   a transition data sampler configured to time transition samples of the serial data stream at transition time intervals nominally separated from the inphase data samples by one-half of the unit interval;
   a decision feedback equalizer configured to apply feedback parameters to adaptively adjust the serial data stream causing asymmetry of a serial data eye defined by the serial data stream;
   a gear shifter configured to apply a variable skew value causing a differential timing between the inphase data samples and the transition samples,
   vary the skew value to cause the transition samples to track the asymmetry of the data eye, apply a first skew value during a phase locking stage while the data sampling controller synchronizes to the serial data stream, the first skew value causing a substantially quadrature relation between the data sampling clock and the transition sampling clock and apply a second skew value during a data transfer stage in response to adaptation of feedback control parameters, wherein the feedback control parameters are initialized to zero and the first skew value is set to zero during the phase locking stage and the feedback control parameters adapt to non-zero values and the second skew value is set to a non-zero value after the phase locking stage to track the asymmetry of the data eye causes by adaptation of feedback control parameters during the data transfer stage.

2. The data sampling controller of claim 1, wherein the feedback control parameters are selected to compensate for inter-symbol interference in the serial data stream.

3. The data sampling controller of claim 2, wherein the feedback control parameters comprise decision feedback equalizer parameters.

4. The data sampling controller of claim 3, wherein the feedback control parameters further comprise a variable gain parameter.

5. The data sampling controller of claim 4, wherein the feedback control parameters further comprise a linear equalizer parameter.

6. A method for deserializing data from a serial data stream into a parallel data stream, comprising the steps of:
   timing inphase data samples of the serial data stream at data time intervals separated by a unit interval duration;
   timing transition samples of the serial data stream at transition time intervals nominally separated from the inphase data samples by one-half of the unit interval;
   applying feedback parameters to adaptively adjust the serial data stream causing asymmetry of a serial data eye defined by the serial data stream;

applying a variable skew value causing a differential timing between the inphase data samples and the transition samples;
varying the skew value to cause the transition samples to track the asymmetry of the data eye;
applying a first skew value causing a substantially quadrature relation between the data sampling clock and the transition sampling clock during a phase locking stage;
applying a second skew value during a data transfer stage after phase locking has been achieved;
initializing the feedback control parameters to zero;
setting the first skew value to zero during the phase locking stage;
adapting the feedback control parameters adapt to non-zero values; and
setting the second skew value to a non-zero value after the phase locking stage to track the asymmetry of the data eye caused by adaption of the feedback control parameters during the data transfer stage.

7. The method of claim 6, further comprising the steps of adapting the feedback parameters to compensate for inter-symbol interference in the serial data stream.

8. The method of claim 6, further comprising the steps of adapting the feedback parameters to adjust a gain parameter.

9. The method of claim 6, further comprising the steps of adapting the feedback parameters to adjust a linear equalizer parameter.

* * * * *